United States Patent [19]

Wiener et al.

[11] 4,335,143

[45] Jun. 15, 1982

[54] DRIED ALBEDO CLOUDING AGENT AND PROCESS THEREFOR

[75] Inventors: Claire Wiener, Spring Valley, N.Y.; Gerhard J. Haas, Woodcliff Lake, N.J.

[73] Assignee: General Foods Corporation, White Plains, N.Y.

[21] Appl. No.: 192,262

[22] Filed: Sep. 30, 1980

[51] Int. Cl.³ .......................... A23L 1/212; A23L 2/00
[52] U.S. Cl. ....................................... 426/50; 426/590; 426/616; 426/471
[58] Field of Search ............... 426/590, 591, 471, 616, 426/640, 50, 481, 456, 465

[56] References Cited

U.S. PATENT DOCUMENTS

| | | |
|---|---|---|
| 2,556,579 | 6/1951 | Forkner .............................. 426/616 |
| 3,404,990 | 10/1968 | Villadsen . |
| 3,647,475 | 3/1972 | Douglas . |
| 4,101,678 | 7/1978 | Baker et al. ........................... 426/50 |
| 4,233,334 | 11/1980 | Owades ................................ 426/456 |

FOREIGN PATENT DOCUMENTS

| | | |
|---|---|---|
| 2405245 | 8/1974 | Fed. Rep. of Germany ...... 426/590 |
| 2331292 | 6/1977 | France . |

OTHER PUBLICATIONS

Stecher P. G. et al., *The Merck Index*, 8th ed., Merck & Co., Inc., Rahway, N. J. ©1968, pp. 619 & 720.

Thirtieth Annual Citrus Processor's Meeting, Evaluation of a Beverage Clouding Agent from Citrus Pectin Pomace Leach Water, Maria Herrara et al., p. 14, Oct. 11, 1979.

Use of Enzymes in Citrus Processing, Braddock and Kesterson, Food Technology, Nov. 1979, pp. 17, 80, 81 and 83.

*Primary Examiner*—Raymond N. Jones
*Assistant Examiner*—Elizabeth J. Curtin
*Attorney, Agent, or Firm*—Thomas A. Marcoux; Daniel J. Donovan; Thomas R. Savoie

[57] ABSTRACT

A process for producing a dried albedo clouding agent which does not impart off-flavors to the beverage is disclosed. The process involves heating albedo-containing material which is then ground and treated with a macerating enzyme. The enzyme is then inactivated and coarse particles are filtered out and discarded. The filtrate is centrifuged to obtain the clouding agent which is then washed with water, isopropyl alcohol or a combination of the two. The clouding agent is dried to obtain a stable product compatible with dry beverage formulas for citrus-type beverages.

10 Claims, No Drawings

DRIED ALBEDO CLOUDING AGENT AND PROCESS THEREFOR

BACKGROUND OF THE INVENTION

1. Field of the Invention

This invention relates to a process for producing from citrus peel or citrus albedo a dried clouding agent which does not impart any off-flavors when used in a citrus-type beverage.

2. Description of the Prior Art

All citrus juices, when freshly expressed, have a characteristic opacity of cloudiness. It is obviously desirable to maintain this opacity in processing citrus juices, and to emulate it in formulated citrus beverages. In the natural juices, "cloud" is provided by minute suspended or colloidal particles of citrus tissue and cell contents.

In formulated beverages, cloudiness is achieved by adding a suitable natural or chemical substance, such a titanium dioxide or brominated vegetable oil. Usually these substances are alien to citrus beverages. In keeping with the current consumer emphasis on natural ingredients, several efforts have been directed toward developing a clouding agent from citrus peel or citrus albedo.

U.S. Pat. No. 3,404,990, granted to Villadsen (1968) discloses a procedure whereby citrus peels are comminuted, heated and then enzyme treated to facilitate the extraction of clouding material. The entire mixture is briefly centrifuged to remove the pulp and the supernatant liquid is pasteurized. Excess water is then evaporated. The final clouding agent product is a liquid concentrate.

French Pat. No. 2,331,292 to Gouin (1975) describes a procedure which is basically similar, but the citrus albedo is sieved, milled and homogenized in such a way as to minimize the amount of pulp discarded, and no enzyme is added. The final clouding agent is a liquid concentrate which has the consistency of fresh cream.

Matthews, Herrera and Crandall of the University of Florida have recently developed a procedure wherein a clouding agent is obtained from the water which has been used to leach citrus peel during pectin or dietary fiber production. The final clouding agent is a liquid concentrate differing from the previous examples in that it is free of pectin and contains soluble carbohydrates as the major component.

Further examination of the literature leads to the conclusion that all prior procedures ultimately produce a liquid concentrate which consists of cloud particles and varying amounts of soluble carbohydrates, and (with the exception of the Matthews procedure) pectinaceous material. Bradock and Kesterson, from the University of Florida, have evaluated typical prior art clouding agents in their article "Use of Enzymes in Citrus Processing," Food Technology, Nov. 1979. They report the following problems:

1. The cloud may be quite bitter; this problem varies with the source of peel.
2. The cloud concentrate has a tendency to brown or darken upon storage; this affects the color of the final beverage product.
3. Clouding ability of the concentrate varies with each batch of peel, which would make standardization of the cloud level in the final beverage extremely difficult.

Villadsen discloses a preliminary boiling step to remove bitter tasting principles consisting of boiling the citrus peel in an equal volume of water for 30 minutes. The water is discarded, allegedly "removing the bitter-tasting principles or part thereof." In agreement with Bradock and Kesterson, experiments conducted by the inventors also demonstrated that the procedure disclosed in the Villadsen patent did not completely remove off-flavors, and that degree of flavor removal remained dependent on the variety and condition of the citrus peel or albedo starting material. In one particular experiment conducted by the present inventors, frozen orange albedo from a mixed batch of Hamlin and Pineapple varieties was utilized as the starting material. After thawing the albedo, the Villadsen extraction procedure was followed-however, the quantity of water was tripled and the extraction was performed twice. Then, in accordance with the teaching of the patent, the drained albedo was comminuted, treated with a pectinaceous enzyme, and freed of coarse material. The resulting cloudy suspension which is the product of the Villadsen process was evaluated in an orange flavored dried beverage mix; the quantity added was the amount required to provide the customary opacity. Benchtop tasters reported strong terpene-like flavors which made the final beverage unacceptable.

By contrast, a portion of the cloudy suspension described above was centrifuged to separate the clouding agent from the supernatant liquid, as taught in the present invention. A portion of this isolated clouding agent was washed with isopropyl alcohol, then water. A second portion was boiled with water, then washed with water. Both samples of isolated clouding agent were evaluated in an orange flavored dried beverage mix. Both were completely flavorless in the beverage.

In addition, it was found that the type of cloud concentrate produced according to prior art procedures is poorly suited for use in a dry formulated beverage because, in a dried state the components are quite unstable and very prone to off-flavor development.

Another disadvantage of these clouding concentrates is the set ratio of clouding capacity to pectin content. In order to obtain a desired opacity, it may be unavoidable to add much more pectin than is optimal for overall beverage quality.

The process of Matthews et al produces a final liquid concentrate which differs from those discussed above since pectin is not a component. However, it is combination of cloud particles and carbohydrates which vary in ratio with batches of peel, so a similar problem in uniformity of end product exists. The problem of inflexibility also exists. To achieve a desired opacity, a set amount of carbohydrates must be added. This restricts the formulator's choice of carbohydrate sources, limiting his ability to optimize flavor or minimize caloric value. Also, browning or darkening on storage has been reported as a problem which must be controlled by freezing or treatment with sulfur dioxide. Finally, the Matthews process was designed to utilize the waste from two relatively small industries. If large quantities of albedo cloud are required, this source is insufficient.

SUMMARY OF THE INVENTION

This invention is a new process whereby a dry clouding agent is produced from albedo which is flavorless in citrus-type beverages and other compatible formulations, such as fruit juices, nectars and other beverages in which a clouding agent is desirable. The process comprises heating albedo to destroy pectin methylesterase, then comminuting the albedo and macerating the slurry by means of enzymatic treatment with a pectolytic enzyme or combination of pectolytic enzymes. Examples of enzymes which can be utilized include Rohament P (from Roehm GmbH, Germany) Ultrazyme 100 (Novo), Pectinex 3XL (Novo), and Pectinol 41P (Rohm & Haas). The macerated mixture is then heated to inactivate the enzyme and filtered or very briefly centrifuged to remove the coarse matter. The filtrate contains the fine, suspended (or colloidal) particles of an albedo clouding agent, measuring an average of 3.0 microns or less, preferably less than 1 micron, together with soluble pectinaceous material and soluble carbohydrates. The albedo clouding agent particles are isolated from the filtrate by utilizing a vacuum or pressure filtration apparatus or preferably by subjecting the filtrate to centrifugation procedures known to those skilled in the art. The resulting albedo cloud particles are washed with water, a water-miscible solvent, or a combination of the two, thereby removing off-flavors and precursors of off-flavors. Preferable solvents are ethanol and isopropyl alcohol. The washed residue is then dried to obtain the clouding agent product.

Any appropriate drying method may be employed to remove residual water after water washing, such as spray drying, oven drying, freeze drying, vacuum drying and evaporation brought about by exposing the residue to a stream of inert gas. If alcohol washing is utilized, removal of alcohol from the albedo clouding particles may be accomplished by washing with water, vacuum drying or other procedures known to those skilled in the art. Spray drying is preferentially carried out in combination with an edible, water-soluble film-former, such as carboxymethylcellulose (CMC) or other cellulose derivatives, dextrins, vegetable gums or pectinaceous materials.

The dried albedo clouding agent is stable and will remain suspended in water. However, if the clouding agent is to be added to a beverage containing citric acid, a film-forming encapsulating material, such as carboxymethylcellulose (CMC), should be utilized to protect the cloud from precipitation with citric acid.

The most important advance brought about in accordance with the invention involves the key step of separating the albedo clouding agent from the pectin containing supernatant fluid. The incorporation of the separation step removes the soluble pectinaceous materials, and carbohydrates, along with precursors of off-flavors, thereby facilitating the final deflavorization treatment of the albedo cloud particles.

This new inventive process is an economical one because the separation of albedo cloud particles greatly reduces the amount of material to be deflavorized, and, consequently, the amount of alcohol required to achieve complete deflavorization. In some instances, further monetary savings can be realized by replacing alcohol washing with water washing. Either option will yield an albedo clouding agent which is flavorless although alcohol washing may provide additional stability during prolonged shelf storage.

Another important advantage resulting from this new inventive process involves the successful drying of the albedo clouding agent to provide a product which is flavorless in beverages. It is well known in the field that drying makes natural food materials more vulnerable to oxidation and, therefore, amplifies the development of off-flavors. There are no reports in the literature of dry albedo clouding agents prepared from the liquid concentrates discussed previously. The present inventors freeze-dried such liquid clouding concentrates (containing cloud particles and pectinaceous material) and found that off-flavors due to oxidation developed rapidly (within an hour after drying). The present inventors have overcome this problem by isolating the clouding agent particles, making it possible to thoroughly wash away all off-flavors and precursors of off-flavors, thereby obtaining a cloud which has flavor stability after drying.

DESCRIPTION OF PREFERRED EMBODIMENT

The initial heating step is not essential for obtaining cloud-containing material from albedo, but it does improve the yield under the conditions described. Likewise, the clouding agent can be prepared without using enzymes. The enzyme treatment optimizes yield and handling but would not be absolutely necessary. If the initial heating and enzymatic treatment steps are omitted, the albedo-containing material, either alone or in combination with water, is comminuted to form a slurry and further processed in the manner previously discussed. The comminution and maceration steps which lead up to the coarse filtration step can be accomplished in many alternate ways, either sequentially or simultaneously in any order known in the art.

The dried albedo clouding agent produced according to this invention is a suitable component to be combined in a dry beverage mix product. A dried beverage mix can be produced which contains in the range of from 0.3 to 3.0% of the dried albedo clouding agent. The preferable range of use varies from 0.6 to 1.2%. The dried albedo clouding agent is stable in a dried condition for a prolonged period of time and cannot be tasted in the percentage utilized to cloud a beverage product. In actuality, the dried albedo clouding agent itself, when in bulk powder form, may retain a slight taste. However, "flavorless" as used in the context of this application shall refer to the taste in a final beverage product which contains an appropriate percentage composition of the dried albedo clouding agent to yield desired opacity.

In utilizing this new inventive process, an antioxidant may be added, preferably after the enzyme is inactivated by heat exposure.

The supernatant obtained in the centrifugation or separation step may be useful as a source of a pectin-containing thickening agent, which may be recombined with the deflavorized clouding agent. A flavorless, powdered thickening agent can be obtained by adding the supernatant to a water-miscible solvent, such as an alcohol, preferably ethanol or isopropyl alcohol, to precipitate the pectinaceous material, separating the precipitate, removing the residual alcohol and drying the material.

Since the finished albedo clouding agent has been separated from the pectinaceous thickening agent, it is possible to add the clouding agent to obtain any desired degree of opacity, without being concerned about organoleptic effects due to excessively high pectin content. The separation of clouding agent from thickening agent thus allows for greater flexibility and is a considerable advantage over the use of liquid concentrates containing a set combination of clouding agent and thickening agent. Also, in liquid concentrates, the inflexible ratio of clouding agent to thickening agent varies with variety and batch of albedo source. Since the process of the present invention yields a dried material consisting essentially of albedo clouding particles, the clouding ability of the end product is uniform regardless of the condition or variety of the albedo-containing starting material.

The invention is more fully described, but not limited, by the following examples.

EXAMPLE 1

400 g. of orange albedo (having approximately 75% moisture content) was placed in an autoclave and heated for 15 minutes at 100° C. under atmospheric pressure. The material was mixed with 800 ml. of water, ground in a Waring Blendor, and then adjusted to 45° C. in a constant temperature bath. To this mixture was added 2.0 g. of Rohament P (a macerating enzyme from Roehm GmbH, Germany). The material was incubated for 30 minutes with stirring. The enzyme was then inactivated by heating to 82°–85° C. and holding this temperature for 15 minutes. Then 200 mg. of citric acid and 16 mg. of ascorbic acid were added to control oxidation during processing, along with 800 ml. of warm water. The mixture was filtered (while still hot) through four layers of cheesecloth. The residue was resuspended in 800 ml. of hot water, stirred for 5 minutes and filtered through cheesecloth. The filtrates were combined and passed through Whatman #1 paper, using a Buchner funnel. The filtrates were centrifuged for one hour at $25,000 \times G$.

In order to accomplish deflavorization, the residue containing the separated clouding agent was washed once with 50% isopropyl alcohol, once with 100% isopropyl alcohol and, finally, twice with water. Each time the washes were removed by centrifugation. The resulting washed clouding agent was then freeze dried. The dried albedo clouding agent particles were analyzed and were found to have an average diameter of less than 0.62 microns. When tested in a citrus-type formulated beverage, the clouding agent did not contribute off-flavors. A sample of the albedo clouding agent was combined in an orange flavored dried beverage mix and stored in sealed pouches. After three months of storage at ambient temperature, the clouding agent did not contribute any off-flavors when evaluated in the hydrated beverage.

EXAMPLE 2

The procedure of Example 1 for preparing the dried citrus albedo clouding agent is repeated through the centrifugation step, producing the residue consisting of the separated clouding agent. However, this time the washing and deflavorization is accomplished by using water alone. Specifically, the residue was boiled with water for 5 minutes and centrifuged at $25,000 \times G$ for 30 minutes. The water was discarded and the residue was washed with water and centrifuged. The washed particles of albedo cloud were then freeze dried. The dried albedo clouding agent produced by this process was likewise flavorless in the reconstituted citrus-type beverage.

EXAMPLE 3

The starting material was citrus peel which had already been processed for the extraction of pectin—the effluent waste normally discarded by the pectin industry. 200 g. of this material (6.8 g., basis solids) was adjusted from pH 2.0 to pH 4.3 by the addition of sodium hydroxide solution. 100 ml. of water was added containing 0.14 g. of Rohament P. The material was incubated and processed as described in Example 1. The yield of clouding agent was comparable (basis solids) to that obtained from fresh albedo.

INDUSTRIAL APPLICATIONS OF INVENTION

Consumer preferences and pressures, and government regulations (both domestic and foreign) are creating an increasing demand for more natural ingredients in formulated beverages. Therefore, a natural dried citrus albedo clouding agent is a desirable industrial product which would be available as a possible replacement for the chemical clouds now in use. Also, in products where natural ingredient labeling is a primary concern, a cloud for citrus-type beverages derived from citrus albedo is more desirable than a cloud which is natural but alien to citrus beverage, such as fat-based cloud. The albedo cloud can be used for liquid beverages or dry mix beverage products without major reformulation since it does not impart off-flavors.

What is claimed is:

1. A process for producing a dried albedo clouding agent from albedo-containing material which comprises:
   (a) comminuting the albedo-containing material and forming a slurry;
   (b) separating said slurry to obtain a liquid filtrate which contains fine suspended and colloidal particles of albedo clouding agent of an average particle size less than 3 microns together with soluble pectinaceous material and soluble carbohydrates and a coarse residue which is discarded;
   (c) isolating the fine suspended and colloidal particles of albedo clouding agent from the liquid phase of the filtrate;
   (d) washing said isolated particles from step (c) with water, a water-miscible solvent or a combination thereof to remove unwanted flavors; and
   (e) drying the washed particles to obtain the dried albedo clouding agent.

2. A process according to claim 1 wherein the albedo-containing material is heated to destroy pectin methylesterase.

3. A process according to claim 2 wherein the comminuted albedo-containing material is macerated by enzymatic treatment and then heated to a sufficient temperature to inactivate the enzyme.

4. A process according to claim 1 wherein the separated fine suspended and colloidal particles of albedo clouding agent are washed with water.

5. A process according to claim 4 wherein the drying is accomplished by means of spray drying in combination with an edible, water-soluble film-former.

6. A process according to claim 5 wherein the edible, water-soluble film-former is selected from the group consisting of dextrins, cellulose derivatives, vegetable gum, and pectinaceous materials.

7. A process according to claim 1 wherein the separated fine suspended and colloidal particles of albedo clouding agent are washed with isopropyl alcohol.

8. A process according to claim 1 whereby the dried albedo clouding agent particles are of an average particle size less than 1 micron.

9. The product produced according to claim 1.

10. A dry beverage mix product which contains in the range of from 0.3 to 2% of the dried clouding agent produced according to claim 1.

* * * * *